United States Patent Office 3,793,278
Patented Feb. 19, 1974

3,793,278
METHOD OF PREPARING SULFONIUM GROUP CONTAINING COMPOSITIONS
Bruce T. De Bona, Monroeville, Pa., assignor to PPG Industries, Inc., Pittsburgh, Pa.
No Drawing. Filed Mar. 10, 1972, Ser. No. 233,725
Int. Cl. C08g 53/18, 30/04
U.S. Cl. 260—29.2 EP                          4 Claims

ABSTRACT OF THE DISCLOSURE

Synthetic resins containing quaternary sulfonium base groups are prepared by reacting a resin containing epoxy groups with a sulfide in the presence of an acid. These resins, which are water dispersible, can be dissolved or dispersed in water to provide aqueous coating compositions, and particularly electrodepositable coating compositions which deposit upon a cathode.

CROSS REFERENCE TO RELATED APPLICATION

Electrodepositable sulfonium group containing resins and their method of electrodeposition have been disclosed in copending application Ser. No. 217,278, filed Jan. 12, 1972 entitled "Epoxy Compositions" by Wismer and Bosso.

DESCRIPTION OF THE INVENTION

This invention relates to a method of preparing water dispersible sulfonium salt group containing resins, preferably containing free epoxy groups, which resins are electrodepositable.

It has been found that synthetic resins preferably containing free epoxy groups and having chemically bound quaternary sulfonium groups and optionally containing oxyalkylene groups can readily be utilized to provide clear or colloidal water solutions. These solutions when solubilized through ionization of the quaternary sulfonium group and an acid counter-ion, as from a quaternary salt can be electrodeposited to provide adherent coatings. The method of this invention is a method of preparing such resins and is essentially a method whereby quaternary sulfonium salt groups are introduced into a resin molecule by reacting a resin containing an epoxy group with sulfide in the presence of an acid.

The preferred resins produced by the method of the invention are ungelled water dispersible epoxy resins having in their molecule at least one 1,2 epoxy group per average molecule, optionally containing oxyalkylene groups and containing chemically-bound quaternary sulfonium base salts, the quaternary sulfonium base salts preferably being salts of boric acid and/or an acid having a dissociation constant greater than boric acid, including organic and inorganic acids. Upon solubilization, at least a portion of the salt is preferably a salt of the acid having a dissociation constant greater than about $1 \times 10^{-5}$ especially where the resin is oxyalkylene group free. Preferably, the acid is an organic, carboxylic acid. The presently preferred acid is lactic acid. Preferably the resin contains from about 0.1 to about 35 percent by weight sulfur and at least about one percent of said sulfur and preferably about 20 percent, more preferably about 50 percent, and most preferably, substantially all, of the sulfur being in the form of chemically-bound quaternary sulfonium base salt groups.

Among the resins which can be produced by the method of this invention there is included (a) Epoxy group-containing resins containing, in addition, quaternary sulfonium groups and oxyalkylene groups, which resins may or may not contain chemically-bound boron or which may be dispersed for electrocoating with or without the addition of a boron compound and especially boric acid or a precursor thereof; or (b) epoxy group-containing resins containing, in addition, quaternary sulfonium base salts of an acid having a dissociation constant greater than $1 \times 10^{-5}$, which resins, while preferably containing oxyalkylene groups, may be devoid of such groups and which resins may or may not contain chemically-bound boron or which resins may be dispersed for electrocoating with or without the addition of a boron compound, and especially boric acid or a precursor thereof.

The epoxy compound can be any monomeric or polymeric compound or mixture of compounds having a 1,2-epoxy equivalency greater than 1.0, that is, in which the average number of 1,2-epoxy groups per molecule is greater than 1. It is preferred that the epoxy compound be resinous, that is, a polyepoxide, i.e., containing more than one epoxy group per molecule. The polyepoxide can be any of the well-known epoxides, provided it contains sufficient epoxy groups so that some residual epoxy groups remain in the product after the oxyalkylation for reaction with the sulfide described hereinafter. Examples of these polyepoxides have, for example, been described in U.S. Pat. Nos. 2,467,171; 2,615,007; 2,716,123; 3,030,336; 3,053,855; and 3,075,999. A useful class of polyepoxides is the polyglycidyl ethers of polyphenols, such as bisphenol A. These may be produced, for example, by etherification of a polyphenol with epichlorohydrin or dichlorohydrin in the presence of an alkali. The phenolic compound may be bis(4-hydroxypenyl)-2,2-propane, 3,4-dihydroxybenzophenone, bis(4-hydroxyphenyl) 1,1-ethane, bis(4-hydroxyphenyl)1,1 - isobutane; bis(4-hydroxytertiary-butylphenyl)2,2 - propane, bis(2-hydroxynaphthyl) methane, 1,5-dihydroxynaphthalene, or the like. Another quite useful class of polyepoxides is produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4 - hydroxycyclohexyl)2,2-propane and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art.

Another often-preferred class of polyepoxides is those containing oxyalkylene groups in the epoxy molecule. Such oxyalkylene groups are typically groups of the general formula:

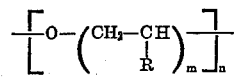

where R is hydrogen or alkyl, preferably lower alkyl (e.g., having 1 to 6 carbon atoms) and where, in most instances, $m$ is 1 to 4 and $n$ is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about one percent by weight or more, and preferably 5 percent or more, of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides. Other monohydric alcohols can be, for example, the commercially-available materials known as Cellosolves and Carbitols, which are monoalkyl ethers of polyalkylene glycols. The reaction of the monohydric alcohol and the polyepoxide is generally carried out in the presence of a catalyst; formic acid, dimethylethanolamine, diethylethanolamine, N,N-dimethylbenzylamine and, in some cases, stannous chloride, are useful for this purpose.

Similar polyepoxides containing oxyalkylene groups can be produced by oxyalkylating the epoxy resin by other means, such as by direct reaction with an alkylene oxide.

The polyepoxide employed to prouce the foregoing epoxies containing oxyalkylene groups should contain a sufficient number of epoxy groups so that the average number of residual epoxy groups per molecule remaining in the product after the oxyalkylation is greater than 1.0. Where oxyalkylene groups are present, the epoxy resin preferably contains from about 1.0 to about 90 percent or more by weight of oxyalkylene groups.

Other epoxy-containing compounds and resins include nitrogenous diepoxides such as disclosed in U.S. Pat. 3,365,471; epoxy resins from 1,1-methylene bis(5-substituted hydantoin), U.S. Pat. 3,391,097; bis-imide containing diepoxides, U.S. Pat. 3,450,711; epoxylated aminomethyldiphenyl oxides, U.S. Pat. 3,312,664; heterocyclic N,N'-diglycidyl compounds, U.S. 3,503,979; amino epoxy phosphonates, British Pat. 1,172,916; 1,3,5-triglycidyl isocyanurates, as well as other epoxy-containing materials known in the art.

The method of this invention comprises forming sulfonium group containing resins by reacting an epoxy compound with a sulfide in the presence of an acid to form quaternary sulfonium base group containing resins.

The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include dialkyl sulfides such as diethyl sulfide, dipropyl sulfide, dibutyl sulfide, dihexyl sulfide, phenyl sulfide or alkyl phenyl sulfides such as diphenyl sulfide, ethyl phenyl sulfide, alicyclic sulfides such as tetramethylene sulfide, pentamethylene sulfide, hydroxyl alkyl sulfides such as thiodiethanol, thiodipropanol, thiodibutanol and the like.

The acid employed may be virtually any acid which forms a quaternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid and sulfuric acid. Preferably the acid is an acid having a dissociation constant greater than about $1 \times 10^{-5}$.

The ratio of sulfide to acid is not unduly critical. Since one mole of acid is utilized to form one mole of sulfonium group, it is preferred that at least about one mole of acid be present for each mole of desired sulfide to sulfonium conversion.

The sulfide/acid mixture and the epoxy compound are reacted by mixing the components, usually at moderately elevated temperatures such as 70–110° C. A solvent is not necessary, although one is often used in order to afford better control of the reaction. Aromatic hydrocarbons, monoalkyl ethers of ethylene glycol, aliphatic alcohols are suitable solvents. The proportions of the sulfide and the epoxy compound can be varied and the optimum proportions depend upon the particular reactants. Ordinarily, however, from about one part to about 50 parts by weight of the sulfide per 100 parts of epoxy compound is employed. The proportions are usually chosen with reference to the amount of sulfur, which is typically from about 0.1 to about 35 percent, based on the total weight of the sulfide and the epoxy compound. Since the sulfide salt reacts with the epoxide groups of the epoxy resin employed, in order to provide an epoxy group-containing resin, the stoichiometric equivalent of the epoxide groups present, so that the final resin is provided with one epoxy group per average molecule.

Where it is desired to incorporate boron into the resin molecule, one method is to incorporate boron by means of an amine borate or nitrogen-containing boron ester as described in copending application Ser. No. 100,825, filed Dec. 22, 1970, the disclosure of which is hereby incorporated by reference. The boron compound reacts with available epoxy groups to provide quaternary ammonium borate groups in the resin molecule.

The reaction of the boron compound may be conducted simultaneously with sulfonium group formation since the reaction conditions for this reaction are similar.

The particular reactants, proportions and reaction conditions should be chosen in accordance with considerations well-known in the art, so as to avoid gellation of the product during the reaction. For example, excessively severe reaction conditions should not be employed. Similarly, compounds having reactive substituents should not be utilized along with epoxy compounds with which those substituents might react adversely at the desired conditions.

The resin product of the invention may be cross-linked to some extent; however, it remains soluble in certain organic solvents and can be further cured to a hard, thermoset state. It is significantly characterized by its epoxy content and chemically-bound quaternary sulfonium content.

Aqueous compositions containing the above reaction products are highly useful as coating compositions and can be applied by any conventional method, such as by dipping, brushing, etc. They are, however, eminently suited to application by electrodeposition.

The resins are water-dispersible per se; however, additional acid solubilizing agents may be added if desired.

The presence of a boron compound in the electrodeposited film is of substantial benefit in that boron compounds apparently catalyze the cure of the deposited film, allowing lower cure temperatures and/or harder films. Where the resin is first prepared without the presence of boron and/or additional boron is desired when the resin is dispersed, a compound of boron may be added, preferably boric acid or a precursor thereof.

The acid or acidic solubilizing agent is preferably any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions. In some cases the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

The resin when placed in a water-containing medium, such as an electrodeposition high solids feed concentrate or the electrodeposition bath, changes character. Since frequently the boron, if present and chemically bonded, is apparently weakly chemically-bound in the resin, it is subject to cleavage from the resin molecule and while the boron electrodeposits with the resin and is found in the electrodeposited film, the boron may be removed from the water-containing medium in whole or in part by separation means, such as electrodialysis or ultrafiltration, in the form of boric acid.

Thus, the resin in aqueous medium can be characterized as a water-containing medium containing an ungelled water-dispersible epoxy resin having at least one 1,2-epoxy group per average molecule, and chemically-bound quaternary sulfonium base salts.

The resin contains from about 0.1 to about 35 percent by weight sulfur, at least about one percent of said sulfur and preferably about 20 percent, more preferably 50 percent, and most preferably, substantially all of the sulfur being in the form of chemically-bound quaternary sulfonium base salt groups; said water-containing medium containing in the preferred embodiment from about 0.01 to about 8 percent by weight of boron contained in boric acid and/or a borate or boric acid complex.

The concentration of the product in water depends upon the process parameters to be used and is, in general, not critical, but ordinarily the major proportion of the aqueous composition is water, e.g., the composition may contain from one to 25 percent by weight of the resin.

Preferably, the electrodepositable compositions contain a coupling solvent. The use of the coupling solvent provides for improved deposited film appearance. These solvents include hydrocarbons, alcohols, esters, ethers, and ketones. The preferred coupling solvents include monoalcohols, glycols, and polyols as well as ketones and ether alcohols. Specific coupling solvents include isopropanol, butanol, isophorone, Pentoxane (4-methoxy-4-methyl pentanone-2), ethylene and propylene glycol, the monomethyl, monoethyl and monobutyl ethers of ethylene glycol, 2-ethylhexanol and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 and about 25 percent by weight of the dispersant is employed.

While the resins hereinabove described may be electrodeposited as substantially the sole resinous component of the electrodeposited composition, it is frequently desirable in order to improve or modify film appearance and/or film properties, to incorporate into the electrodepositable compositions various non-reactive and reactive compounds or resinous materials such as plasticizing material, including N-cyclohexyl-p-toluene sulfonamide, ortho- and para-toluene sulfonamide, N-ethyl-ortho- and para-toluene sulfonamide, aromatic and aliphatic polyether polyols, phenol resins including allyl ether containing phenolic resins, liquid epoxy resins, quadrols, polycaprolactones; triazine resins such as melamine based resins and benzoguanamine-based resins, especially alkylated formaldehyde reaction products thereof; urea formaldehyde resins, acrylic resins, hydroxy and/or carboxyl group-containing polyesters and hydrocarbon resins.

Other materials include esters such as butylbenzyl phthalate, dioctyl phthalate, methyl phthalylethyl glycolate, butylphthalylbutyl glycolate, cresyl diphenyl phosphate, 2-ethylhexyl diphenyl phosphate, polyethylene glycol 200 dibenzoates, as well as polyesters, 2,2,4-trimethyl pentanedio monoisobutyrate (Texanol).

In most instances, a pigment composition and, if desired, various additives such as anti-oxidants, surfactants, or wetting agents, for example, Foam Kill 639 (a hydrocarbon oil-containing inert diatomaceous earth), as well as glycolated acetylenes (the Surfynols, for example), sulfonates, sulfated fatty amides, and alkylphenoxypolyoxyalkylene alkanols, and the like, are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general, similar to those used in electrodeposition of other types of coatings. The applied voltage may be varied greatly and can be for example, as low as one volt or as high as several thousand volts, although typically between 50 and 500 volts. The current density is usually between about 1.0 ampere and 15 amperes per square foot, and tends to decrease during electrodeposition.

The resin when freshly electrodeposited on the cathode contains quaternary sulfonium base groups. The acid moiety which forms the salt migrates at least in part toward the anode. Where the electrodeposition bath contains boron, the electrodeposited resin further contains boron which is bonded with the basic groups present in the film which has electrodeposited upon the cathode. The amounts of bonded boron in the electrodeposited film increase with increasing boron concentration in the bath to a saturation value, dependent on the number of basic groups in the concentration and the basicity of the base groups.

The film, while it may be crosslinked to some extent, remains soluble in certain organic solvents.

The freshly-deposited, uncured electrodepositable film may be characterized as follows: an epoxy resin electrodeposited upon an electrically-conductive substrate comprising an ungelled epoxy resin having at least one 1,2-epoxy group per average molecule, chemically-bound quaternary sulfonium base, and where boron is present in the electrodepositable composition, 0.01 to about 8 percent by weight of boron.

The electrodeposition method is applicable to the coating of any conductive substrate, and especially metals such as steel, aluminum, copper, magnesium, or the like. After deposition, the coating is cured, usually by baking at elevated temperatures. Temperatures of 250° to 500° F. for one to 30 minutes are typical baking schedules utilized.

During the cure, especially at elevated temperatures, at least a substantial portion of the quaternary sulfonium base decomposes to sulfides, which aids in the crosslinking of the coating, which upon curing is infusible and insoluble. The presence of boron salts and complexes in the film increases the rate of crosslinking, reduces the temperatures necessary for acceptable curing in commercially-reasonable times and produces coatings with improved hardness and corrosion resistance.

As set forth above, the significant resin constituents are (A) a resin having epoxy groups, and optionally oxyalkylene groups; (B) quaternary sulfonium groups, as salts of acids preferably having a dissociation constant greater than $1 \times 10^{-5}$, and, optionally (C) boron. All these components may be qualitatively and quantitatively determined by numerous methods known in the art.

Epoxy groups may be determined by the well-known pyridinium hydrochloride method as described, for example, in Siggia, "Quantitative Organic Analysis Via Functional Groups," John Wiley & Sons, Inc., New York (1963), p. 242.

The total base groups present in the polymer, including quaternary groups present, may be determined on a separate resin sample. Usually the resin sample will be neutral. If, however, the resin is basic, the sample should be neutralized with a known amount of the acid present in the resin as a salt. Where the acid present in the resin as a salt is a weak acid as compared to HCl, the resin is titrated with HCl and back-titrated with sodium hydroxide on an automatic titrator. The HCl titration yields the total base groups present. For example, a typical analysis is conducted as follows: a 10 milliliter sample of an about 10 percent solids electrodeposition bath is pipetted into 60 milliliters of tetrahydrofuran. The sample is titrated with 0.1000 normal HCl to the pH end point. The amount of standard acid used is equivalent to the quaternary base present. The sample is then back titrated with 0.1000 normal sodium hydroxide to give a titration curve with multiple end points. In a typical instance, the first end point corresponds to excess HCl. From the HCl titration, the second end point corresponds to the neutralization of the weak acid (for example, lactic acid). The difference in volume between the two endpoints gives the volume of standard base equivalent to the weak acid content of the sample.

Whereas solvent such as propylene glycol is employed with, for example tetrahydrofuran to maintain sample homogeneity, boron present will also titrate since the boron in the form present forms an acid complex with the propylene glycol. Under the conditions specified, the boric acid may be distinguished from the weak acid (e.g., lactic) by an additional inflection point in the pH titration curve.

In the case of the presence of acid salts of strong acids, other methods must be employed to determine acid and quaternary groups present. For example, where the resin contains quaternary hydrochloride groups, the resin may be dispersed, for example, in a mixture of glacial acetic acid and tetrahydrofuran, the chloride complexed with mercuric acetate and the sample titrated with perchloric acid to yield the quaternary groups.

Boron may be determined as described by R. S. Braman, "Boron Determination," Encyclopedia of Industrial Chemical Analysis, F. D. Snell and Hilton editors, John Wiley & Sons, Inc., New York (1968), vol. 7, pp. 384–423. The boron may be determined on a separate sample. For example, by pipetting a 10 milliliter sample of an approximately 10 percent solid cationic electrodeposition bath into 60 milliliters of distilled water. Sufficient HCl is then added to lower the pH to about 4.0. The sample is then back-titrated with 0.1000 normal sodium hydroxide, using a Metrohm Potentiograph E-436 automatic titrator or equivalent apparatus, to the first inflection point in the pH titration curve. There is then added 7 grams of mannitol. The solution becomes acid and titration is then continued to the second inflection point in the pH titration curve. The amount of base consumed between the first and second end points is the measure of the number of moles of boric acid complex formed in the sample.

The above description is exemplary of the technique employed to quantitatively and qualitatively identify the groups present. In specific case, analytical techniques may be adapted to a specific resin; however, in each case, consistent with the above description, there exist methods known in the art which yield appropriate accurate determinations of the significant chemical moiety content.

Illustrating the invention are the following examples, which, however, are not to be construed as limiting the invention to their details. All parts and percentages in the examples, as well as throughout this specification, are by weight unless otherwise specified.

Example I

Into a reactor equipped with thermometer, stirrer, with reflux condenser, and means for providing an inert gas blanket were charged 885 parts of Epon 829 together with 151 parts of bisphenol A. The mixture was heated to 170° C. and held at 185° C. for 45 minutes. The reaction mixture was then cooled to 160° C. and there was then added 424 parts polypropylene glycol 600, together with 2.7 parts of dimethylaminoethanol. The reaction mixture was held at 135° C. until the reaction mixture attained a Gardner-Holdt viscosity of R (about 6 hours), the Gardner-Holdt viscosity being measured as a 50 percent solids solution in 90/10 isophorone/toluene. The 50 percent solution had an epoxide equivalent of 1922 and a hydroxyl value of 143. There was then added 1.8 parts of 90 percent formic acid to neutralize the catalyst present.

To the reaction mixture at 100° C. was then added 75 parts of isopropanol. To the reaction mixture at 80° C. there was then added a solution of 104 parts of thiodiethanol in 90 parts of 85 percent lactic acid, and 80 parts isopropanol. This mixture was added over a 20-minute period, the temperature rising to 90° C. The reaction mixture was held at 95° C. for 8 minutes after the completion of the addition. There was then added 488 parts of deionized water, 7.4 parts of a surfactant (Foam-Kill 639) and 95 parts of 2-ethylhexanol. The resultant 65 percent solids solution had an epoxide equivalent of 3199 and a hydroxyl value of 70. This material is hereinafter identified as the vehicle resin.

In a manner similar to the above, a grinding vehicle resin was prepared, with the exception that after the addition of polypropylene glycol 600 and dimethylaminoethanol, the reaction mixture was held for approximately 4 hours to a Gardner-Holdt viscosity of M, measured in the same manner as above. The product at 50 percent solids had an epoxy equivalent of 1649 and a hydroxyl value of 135.

After addition of formic acid to neutralize the catalyst, there was then added a solution of 208 parts of thiodiethanol, 180 parts of 85 percent lactic acid in 80 parts of isopropanol. The mixture was added to the previous reaction mixture at 82° C. over a 20 minute period, the temperature rising to about 90° C. The reaction mixture was held at 91–95° C. for 8 minutes, after the addition was complete.

To this reaction product was added 488 parts of deionized water, 7.4 parts of surfactant (Foam-Kill 639) and 95 parts of 2-ethylhexanol. The resultant product was a 65 percent resin solution. This resin solution is identified as the grinding vehicle resin.

The pigment paste was prepared by grinding in a steel ball mill 396 parts of titanium dioxide, 4 parts of carbon black and 143 parts of the grinding vehicle resin above, together with 200 parts of deionized water. The pigment paste was ground to a Hegman No. 7 grind gauge reading.

An electrodeposition bath was prepared by slowly admixing 392 parts of the vehicle resin, 160 parts of the above pigment paste and 3250 parts of deionized water.

Zinc-phosphated steel panels were electrocoated from the above electrodeposition bath at 85° F. at 300 volts for 90 seconds. The resultant electrodeposited film was baked at 350° F. for 25 minutes. The baked film had a thickness of 0.55 mil, was smooth and glossy, although cratered.

The electrodepositable composition had a rupture voltage in excess of 500 volts at 85° F. and had a throw power at 500 volts of 5 inches at 66° F., measured in the Ford throw power test.

Example II

Into a reactor equipped with stirrer, thermometer, addition means and in inert blanket were charged 500 parts of Epon 836 and this was then heated to 85° C. There was then added over a two-minute period with stirring a solution comprising 55 parts of thiodiethanol, 48.3 parts of 85 percent lactic acid and 10 parts of water. The reaction mixture was held at 85° C. for 20 minutes and there was then added an additional 10 parts of water and the reaction mixture held between 85–88° C. for five minutes. There was then added an additional 10 parts of water.

The above reaction mixture had an epoxy value of 836 and a hydroxyl value of 215.

The above reaction product was diluted to 10 percent solids to form an electrodeposition bath having a pH of 6.4. Aluminum panels were electrocoated at 100 volts for one minute at a bath temperature of 75° F. Steel panels were electrocoated at 200 volts for one minute. The resultant films showed good wet film strength and when baked at 350° F. for 15 minutes showed a film with high gloss and thermoplastic character.

Example III

In the manner of Example II, 500 parts of Epon 836 (viscous diglycidyl ether of bisphenol A resin) and 50 parts of butyl cellosolve were charged into a reactor and heated to 82° C. There was then added a solution comprising 55.5 parts of thiodiethanol, 28.2 parts of boric acid and 40 parts of 1,2-propanediol and 10 parts of water over a 2-minute period at 82° C. After 7 minutes, an additional 20 parts of water were added. After an additional 20 minutes at 82° C., an additional 10 parts of water were added. The reaction mixture was heated and the solution became clear at a temperature of 102° C. The reaction mixture had an epoxy value of 644 and a hydroxyl value of 257. The resultant resin was electrodepositable.

Example IV

Into a reactor equipped with a stirrer, thermometer, and inert gas blanket were charged 500 parts of Epon 836 and the reactor heated to 95° C. There was then added a solution of 55.5 parts of thiodiethanol, 52.4 parts of 85 percent phosphoric acid and 10 additional parts of water over a four-minute period at 95° C. After 10 minutes, there was added a mixture of butyl Cellosolve and 10 parts of water, which mixture was added over a period of 50 minutes. There was then added 45 parts of water. A clear resin results at a temperature of 101° C. A 10 percent solids solution of the resin was electrodepositable.

Example V

Into a reactor equipped with stirrer, thermometer and addition means were charged 165 parts of Epon 836 and the mixture heated to 56° C. A solution of 22.5 parts of diethyl sulfide, 26.5 parts of 85 percent lactic acid and 5 parts of butyl Cellosolve was added to the reactor and the mixture stirred for one hour while raising the temperature to 85° C. There was then added 10 parts of water and after an additional 40 minutes at a reaction temperature of 70° C. an additional 10 parts of water were added. The resultant water-dispersible reaction mixture had a hydroxyl value of 110 and an epoxy value of 5723.

The reaction mixture was reduced to 10 percent solids with water and aluminum and steel panels electrocoated at 100-150 volts for one minute to give 0.2 mil film. After baking for 30 minutes at 350° F. the film had good flow, high gloss and thermoplastic character.

Other reaction products can be formed and utilized using other epoxy compounds, amines, sulfides, acids, salts and boron compounds as described above. Similarly, other conditions and adjuvants and the like may be employed to formulate and utilize the coating compositions as desired.

According to the provisions of the patent statutes, there are described above the invention and what are now considered to be its best embodiments; however, within the scope of the appended claims, it is to be understood that the invention can be practiced otherwise than as specifically described.

I claim:
1. A method of preparing an electrodepositable composition comprising the steps of
  (a) reacting a 1,2-epoxy group-containing resin having an epoxy equivalent greater than 1.0 with a sulfide selected from the group consisting of aliphatic, mixed aliphatic-aromatic, aralkyl and cyclic sulfide in the presence of an acid having a dissociation constant greater than $1 \times 10^{-5}$, thereby forming quaternary sulfonium salt groups and
  (b) dispersing the resultant quaternary sulfonium salt group-containing resin in water.
2. A method as in claim 1 wherein the sulfide is selected from the group consisting of lower dialkyl sulfides, mixed aryl lower alkyl sulfides and diaryl sulfide.
3. A method as in claim 1 wherein the acid is a monocarboxylic acid.
4. A method as in claim 1 wherein the reaction is conducted at moderate temperature below about 110° C.

References Cited
UNITED STATES PATENTS 3,468,816   9/1969   Thompson et al. ____ 260—2 X
3,429,839   2/1969   Franco _____ 260—47 X

OTHER REFERENCES

Chemical Abstracts, vol. 70, 1969, p. 28122k.

WILLIAM H. SHORT, Primary Examiner

T. E. PERTILLA, Assistant Examiner

U.S. Cl. X.R.

117—132 BE; 156—150; 204—181; 260—2 Ep, 47 Ep, 59, 77.5 NC, 784 Ep, 79 R 348 R, 830 TW, 834, 835, 836